United States Patent [19]

Kaczur et al.

[11] Patent Number: 5,354,435
[45] Date of Patent: * Oct. 11, 1994

[54] EFFLUENT TREATMENT IN A PROCESS FOR PRODUCING CHLORINE DIOXIDE FROM CHLORIC ACID

[75] Inventors: Jerry J. Kaczur; David W. Cawlfield; Kenneth E. Woodard, Jr., all of Cleveland; Budd L. Duncan, Athens; Sudhir K. Mendiratta, Cleveland, all of Tenn.

[73] Assignee: Olin Corporation, Cheshire, Conn.

[ * ] Notice: The portion of the term of this patent subsequent to Jan. 28, 2009 has been disclaimed.

[21] Appl. No.: 999,419

[22] Filed: Dec. 31, 1992

Related U.S. Application Data

[60] Continuation-in-part of Ser. No. 765,078, Sep. 24, 1991, Pat. No. 5,223,101, which is a division of Ser. No. 475,603, Feb. 6, 1990, Pat. No. 5,084,148.

[51] Int. Cl.$^5$ .......................... C25B 1/24; C01B 11/02
[52] U.S. Cl. ..................... 204/95; 423/478; 423/DIG. 13
[58] Field of Search ............ 204/95, 98, 101; 423/477, 478

[56] References Cited

U.S. PATENT DOCUMENTS

| | | | |
|---|---|---|---|
| 3,619,350 | 11/1971 | Marchfelder | 162/67 |
| 4,362,707 | 12/1982 | Hardee et al. | 423/478 |
| 5,084,148 | 1/1992 | Kaczur et al. | 204/95 |
| 5,227,031 | 7/1993 | Sundblad | 204/104 |
| 5,242,553 | 9/1993 | Kaczur et al. | 204/95 |
| 5,242,554 | 9/1993 | Kaczur et al. | 204/95 |
| 5,248,397 | 9/1993 | Cawlfield et al. | 204/95 |
| 5,284,443 | 2/1994 | Lipsztajn et al. | 204/95 |

Primary Examiner—John Niebling
Assistant Examiner—Brendan Mee
Attorney, Agent, or Firm—William A. Simons

[57] ABSTRACT

The novel process of the invention produces chlorine dioxide by feeding an aqueous solution of chloric acid to a chlorine dioxide generator. The aqueous solution of chloric acid is reacted with a reducing agent in the chlorine dioxide generator to produce chlorine dioxide and a spent chloric acid solution containing metallic impurities. A portion of the spent chloric acid solution containing metallic impurities is reacted with a basic compound selected from the group consisting of alkali metal hydroxides, and alkali metal carbonates in a neutralizing zone to form a precipitate of the metallic impurities and an alkali metal chlorate solution. The precipitate of the metallic impurities is separated from the alkali metal chlorate solution and the alkali metal chlorate solution fed to an ion exchange compartment of an electrolytic cell having an anode compartment, a cathode compartment, and at least one ion exchange compartment between the anode compartment and the cathode compartment. Electrolysis of an anolyte in the anode compartment generates hydrogen ions which pass through a cation exchange membrane into the ion exchange compartment to displace alkali metal ions and produce an aqueous solution of chloric acid and alkali metal chlorate. The aqueous solution of chloric acid and alkali metal chlorate is returned to the chlorine dioxide generator. The process of the invention produces chlorine dioxide free of chlorine from mixtures of oxy-chlorine species. A continuous removal of metallic impurities permits avoiding or significantly increasing the time period between generator shutdowns.

13 Claims, 4 Drawing Sheets

10

EFFLUENT TREATMENT IN A PROCESS FOR PRODUCING CHLORINE DIOXIDE FROM CHLORIC ACID

This is a Continuation-in-Part application of U.S. Ser. No. 07/765,078, filed Sep. 24, 1991, now U.S. Pat. No. 5,223,103 issued on Jun. 29, 1993, which is a division of application Ser. No. 07/475,603, filed Feb. 6, 1990, now U.S. Pat. No. 5,084,148 issued Jan. 28, 1992.

FIELD OF THE INVENTION

This invention relates to a process for producing chlorine dioxide. More particularly, this invention relates to the treatment of effluents formed in the production of chlorine dioxide from a chloric acid solution.

BACKGROUND OF THE INVENTION

Chlorine dioxide has found wide use as a bleaching agent in pulp and paper production, as a disinfectant in water treatment/purification, and a number of other uses because of its high oxidizing power. There are a number of chlorine dioxide generator systems and processes available in the marketplace. Most of the very large scale generators utilize a chlorate salt, a chloride ion source or reducing agent, and a strong acid such as sulfuric or hydrochloric acid. Reducing agents which have been used include methanol or other organic compounds, sulfur, sulfur dioxide or other sulfur-oxygen species having a sulfur valence of less than +6, and carbon monoxide among others. When organic compounds are used, unreacted volatile organics including formic acid are present in the product gas.

When using sulfuric acid or sulfur containing reducing agents, the sulfate produced accumulates as a waste product. In addition, prior art processes for the production of chlorine dioxide from chlorate salts require an excess of the acid used. This acid is slowly neutralized by the accumulation of alkali metal or alkaline earth metal ions that enter the process with the chlorate salt. The accumulation of salts must be removed as a waste stream, either liquid or solid, in every process currently practised commercially. Also present in the acidic salt slurry or solution formed in the generator are trace amounts of metals such as transition metals which are present in the reactants or leached or extracted from the apparatus or catalysts used. Accumulation of these impurities and by-products requires periodic shutdowns of the generator for boil-outs or catalyst changes. Thus a process which reduces the amount of a by-product salt, such as sodium chloride or sodium sulfate, and removes metallic impurities produced while efficiently generating chlorine dioxide is commercially desirable.

In U.S. Pat. No. 4,806,215, Twardowski describes a method for producing chlorine dioxide in which the chlorine dioxide is produced in a generator by the reaction of sodium chlorate and hydrochloric acid. After separating chlorine dioxide gas containing chlorine, the remaining sodium chloride solution is fed to the central compartment of a three-compartment cell to form an acidified liquor containing hydrochloric acid. The sodium ions pass through a cation exchange membrane to the cathode compartment to form sodium hydroxide. Sodium hydroxide and the acidified sodium chloride solution are returned to the chlorine dioxide generator. The process accumulates acidified sodium chloride which requires disposal.

To avoid the formation of an acidic alkali metal salt, it has been proposed that chlorine dioxide be prepared from chloric acid. Chloric acid is, however, not commercially available.

Chloric acid preparation has been taught, for example, in U.S. Pat. No. 3,810,969 issued May 14, 1974 to A.A. Schlumberger. Schlumberger teaches a process for producing chloric acid by passing an aqueous solution containing from 0.2 gram mole to 11 gram moles per liter of an alkali metal chlorate such as sodium chlorate through a selected cationic exchange resin at a temperature from 5° to 40° C. The process produces an aqueous solution containing from 0.2 gram mole to about 4.0 gram moles of $HClO_3$. This process requires the regeneration of the cationic exchange resin with acid to remove the alkali metal ions and the treatment or disposal of the acidic salt solution.

K.L. Hardee et al, in U.S. Pat. No. 4,798,715 issued Jan. 17, 1989, describe a process for chlorine dioxide which electrolyzes a chloric acid solution produced by passing an aqueous solution of an alkali metal chlorate through an ion exchange resin. The electrolyzed solution contains a mixture of chlorine dioxide and chloric acid which is fed to an extractor in which the chlorine dioxide is stripped off. The ion exchange resin is regenerated with hydrochloric acid and an acidic solution of an alkali metal chloride formed.

Each of the above processes produces a fixed amount and type of by-product salt.

M. Lipsztajn et al., in U.S. Pat. No. 4,915,927 issued Apr. 10, 1990, teach an electrolytic-dialytic process for producing chloric acid and sodium hydroxide from sodium chlorate. The sodium chlorate is fed to the central compartment of a three-compartment cell. Chlorate ions are transferred through an anion-exchange membrane to the anode compartment and sodium ions are passed through a cation-exchange membrane to the cathode compartment.

R. M. Berry et al., (PCT WO 90/10733, Sep. 20, 1990) also teach an electrolytic-dialytic process for producing chloric acid and sodium hydroxide from sodium chlorate. The electrochemical cell uses a three compartment water splitting system comprised of repeating cationic, anionic, and bipolar membranes. An alkali metal chlorate solution is fed into a center salt compartment bounded by an anion membrane and cation membrane, between adjoining acid and base compartments which adjoin the bipolar membranes. The alkali metal ions move under the applied direct current from the salt compartment cation membrane into the acid compartment to form the alkali metal hydroxide, and the chlorate ions move through the salt compartment anion membrane into the acid compartment to form chloric acid.

Also present in the acidic salt slurry or solution formed in the generator are trace amounts of metals such as transition metals which are present in the reactants or leached or extracted from the apparatus or catalysts used. Accumulation of these impurities and by-products requires periodic shutdowns of the generator for boil-outs or catalyst changes.

SUMMARY OF THE INVENTION

Now a process has been discovered which produces chlorine dioxide free of chlorine from mixtures of oxychlorine species. The process is operated to produce an acidic chlorate salt by-product which is reduced to chlorine dioxide. In addition, the process of the invention permits a continuous removal of metallic impurities avoiding or significantly increasing the time period between generator shutdowns. Further, alkali metal ions are separated and reacted to produce solutions of alkali metal hydroxides or carbonates. Still further, the process provides increased rates of chlorine dioxide production as the generator is free of precipitated salt solids. These and other advantages are accomplished in a process for producing chlorine dioxide which comprises:

a) feeding an aqueous solution of chloric acid to a chlorine dioxide generator, b) reducing the aqueous solution of chloric acid in the chlorine dioxide generator to produce chlorine dioxide and a spent chloric acid solution containing metallic impurities, c) reacting a portion of the spent chloric acid solution containing metallic impurities with a basic compound selected from the group consisting of alkali metal hydroxides, and alkali metal carbonates in a neutralizing zone to form a precipitate of the metallic impurities and an alkali metal chlorate solution, d) separating the precipitate of the metallic impurities from the alkali metal chlorate solution, e) feeding the alkali metal chlorate solution to an ion exchange compartment of an electrolytic cell having an anode compartment, a cathode compartment, and at least one ion exchange compartment between the anode compartment and the cathode compartment, f) electrolyzing an anolyte in the anode compartment to generate hydrogen ions, g) passing the hydrogen ions from the anode compartment through a cation exchange membrane into the ion exchange compartment to displace alkali metal ions and produce an aqueous solution of chloric acid and alkali metal chlorate, h) passing alkali metal ions from the ion exchange compartment through a cation exchange membrane into the cathode compartment, and, i) returning the aqueous solution of chloric acid and alkali metal chlorate to the chlorine dioxide generator.

BRIEF DESCRIPTION OF THE DRAWING

More in detail, the novel process of the present invention and its application in producing chlorine dioxide can be carried out in apparatus illustrated in the following FIGURES.

DETAILED DESCRIPTION OF THE DRAWING

Figure 1:
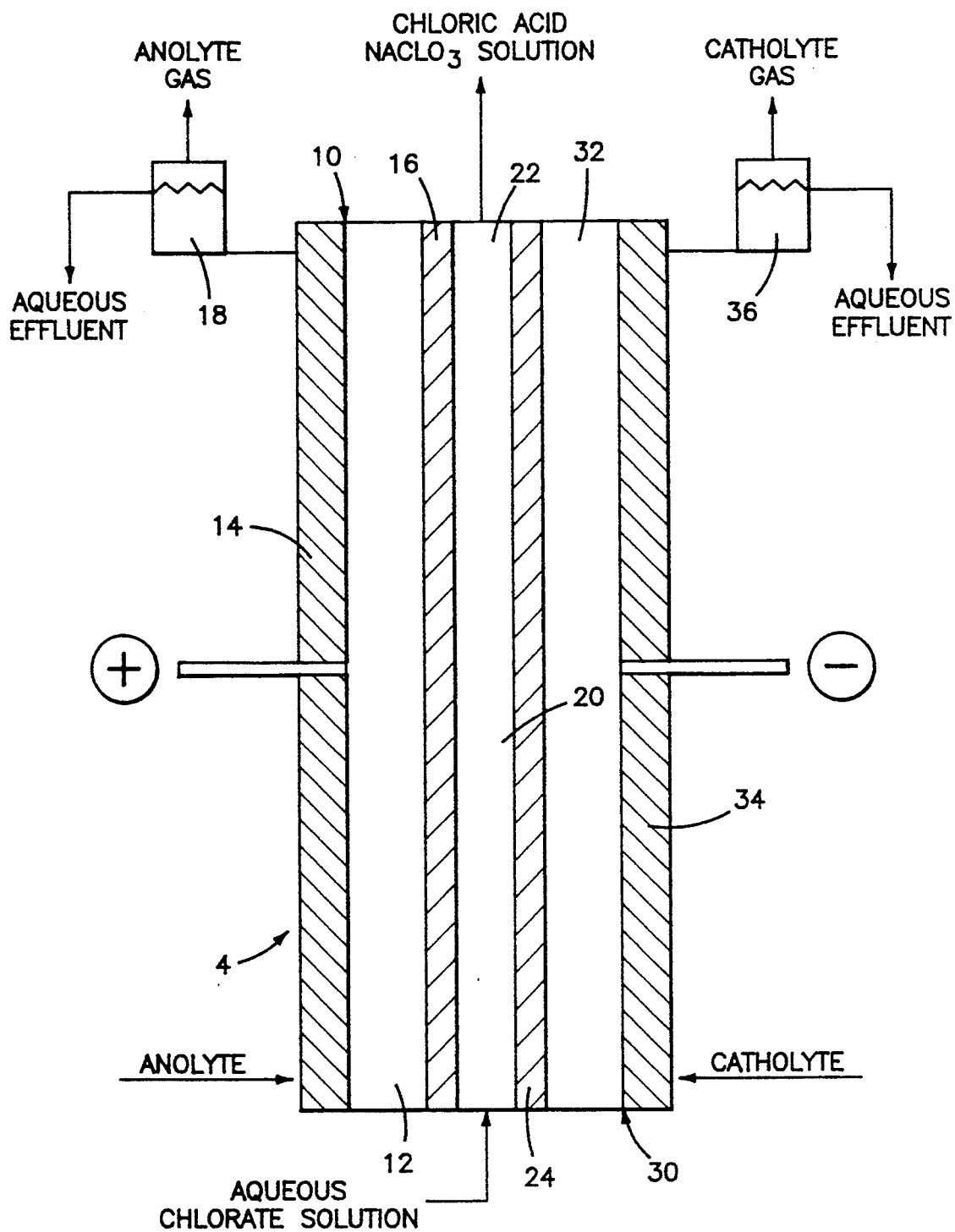
FIG. 1 is a sectional side elevational view of an electrolytic cell which can be employed in the novel process of the invention.

FIG. 1 shows an electrolytic cell 4 divided into anode compartment 10, ion exchange compartment 20, and cathode compartment 30 by cation permeable ion exchange membranes 16 and 24. Anode compartment 10 includes anode 12, and anode spacer 14. Anode spacer 14 positions anode 12 with respect to cation permeable ion exchange membrane 16 and aids in the disengagement of anolyte gas produced. Anolyte disengager 18 completes the disengagement of anolyte gas from the spent anolyte solution. Ion exchange compartment 20 includes spacer material 22 which provides a flow channel between cation permeable ion exchange membranes 16 and 24 for the aqueous alkali metal chlorate solution. Cathode compartment 30 includes cathode 32, and cathode spacer 34. Cathode spacer 34 positions cathode 32 with respect to cation permeable ion exchange membrane 24 and aids in the disengagement of catholyte gas produced. The disengagement of catholyte gas from the spent catholyte solution is accomplished in cathode disengager 36.

Figure 2:
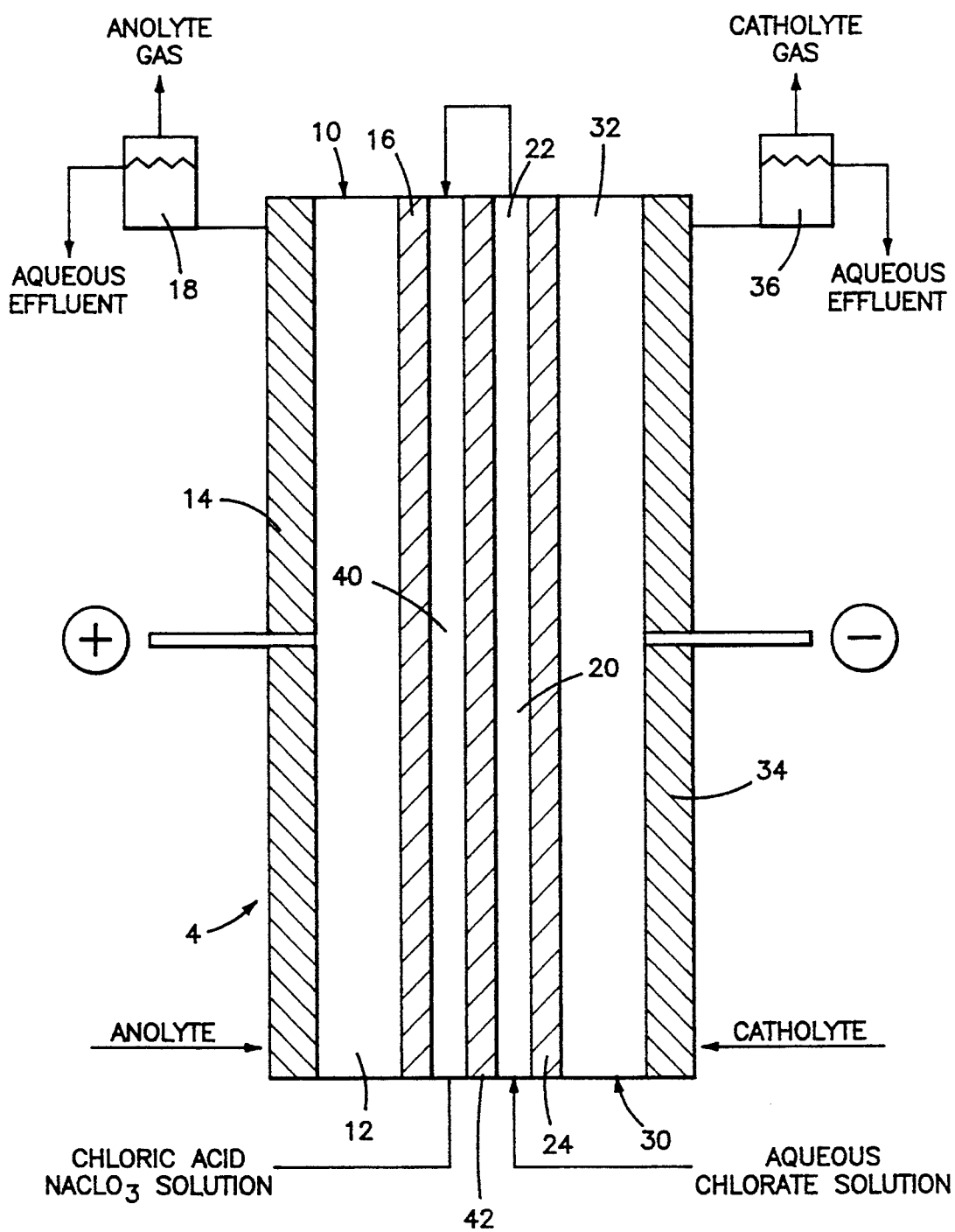
FIG. 2 is a sectional side elevational view of an additional electrolytic cell which can be employed in the novel process of the invention.

In FIG. 2, electrolytic cell 4 has been expanded to include a second ion exchange compartment 40 which is positioned between anode compartment 10 and ion exchange compartment 20. Cation permeable ion exchange membrane 42 separates anode compartment 10 from ion exchange compartment 40. The sodium chlorate feed solution enters the lower part of ion exchange compartment 20, flows upward and out of ion exchange compartment 20 into the upper part of ion exchange compartment 40. The $HClO_3/NaClO_3$ product solution is recovered from the lower part of ion exchange compartment 40.

The flow direction in the ion exchange compartments can also be reversed, for example, with the solution from the top of ion exchange compartment 40 being fed to the bottom of ion exchange compartment 20. The product solution then exits from the top of ion exchange compartment 20.

Figure 3:
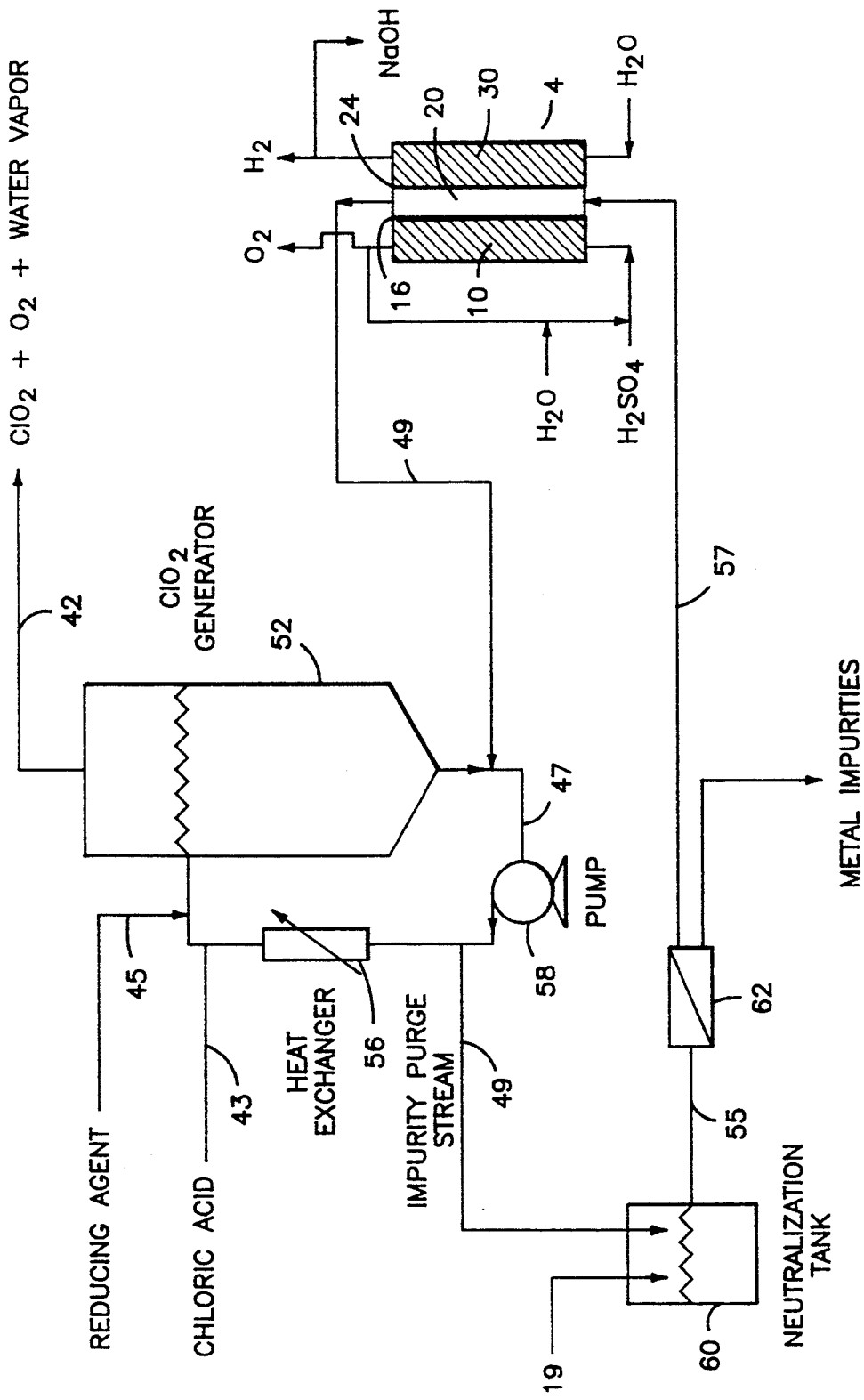
FIG. 3 is a diagrammatic illustration of a system which can be employed in the process of the invention.

In the system illustrated in FIG. 3, an aqueous chloric acid solution is fed through line 43 to chlorine dioxide ($ClO_2$) generator 52. Also fed to chlorine dioxide generator 52 through line 45 is a reducing agent. Within chlorine dioxide generator 52 the aqueous chloric acid solution is reduced and a gaseous mixture of $ClO_2$, oxygen and water vapor is produced. After passing through a demister (not shown), the gaseous mixture is removed from chlorine dioxide generator 52. A spent chloric acid solution containing metal impurities is removed from chlorine dioxide generator 52 through line 47 by pump 58. A portion of the spent chloric acid solution containing metal impurities passes from line 47 through line 49 and is fed to neutralization tank 60. A solution of sodium hydroxide and/or sodium carbonate is added to neutralization tank 60 through line 19 to react with and precipitate metal impurities. A slurry of metal impurities in an alkaline sodium chlorate solution is passed through line 55 to separator 62 which removes the precipitate metal impurities. The alkaline sodium chlorate solution is passed through line 57 to electrolytic membrane cell 4. Electrolytic membrane cell 4 is divided into anode compartment 10, ion exchange compartment 20, and cathode compartment 30 by cation permeable ion exchange membranes 16 and 24. The alkaline sodium chlorate solution enters the lower part of ion exchange compartment 20. Ion exchange compartment 20 includes a flow channel between cation permeable ion exchange membranes 16 and 24 for the alkaline sodium chlorate solution. During electrolysis of the anolyte, an acid such as sulfuric acid, hydrogen ions are produced. Hydrogen ions pass from anode compartment 10 through cation permeable ion exchange membrane 16 into ion exchange compartment 20. The hydrogen ions displace sodium ions and a solution of chloric acid and sodium chlorate, $HClO_3/NaClO_3$, is produced. The solution of chloric acid and sodium chlorate flows out of ion exchange compartment 20 through line 49 into line 47 where it is mixed with spent chloric acid solution. The mixture passes through heat exchanger 56 and is returned to chlorine dioxide generator 52.

DETAILED DESCRIPTION OF THE INVENTION

Suitable for use in the novel process of the present invention are aqueous solutions of chloric acid, $HClO_3$, which can be produced by any suitable process. Recently it has been discovered that highly pure chloric acid can be produced by the direct oxidation of an aqueous solution of hypochlorous acid having very low concentrations of chloride ions and dissolved chlorine and substantially free of other anionic or cationic impurities. Suitable processes for the production of the chloric acid solutions used in the process of the invention are described in U.S. Pat. No. 5,089,095, issued Feb. 18, 1992 and U.S. Pat. No. 5,108 560 issued Apr 28, 1992 to D.W. Cawlfield et al. In the first process an aqueous solution of hypochlorous acid is heated at a temperature in the range of 25° to 120° C. and a solution of chloric acid produced. Alternatively, in the second process an aqueous solution of hypochlorous acid is fed to the anode compartment of an electrolytic cell having an anode compartment, a cathode compartment, and an ion exchange membrane separating the anode compartment from the cathode compartment. The hypochlorous acid solution is electrolyzed in the anode compartment during a residence time of less than about 8 hours to produce a solution of chloric acid of high purity. Where desired, the chloric acid solution may be concentrated by heating the solution at a temperature above about 40° C.

Figure 4:
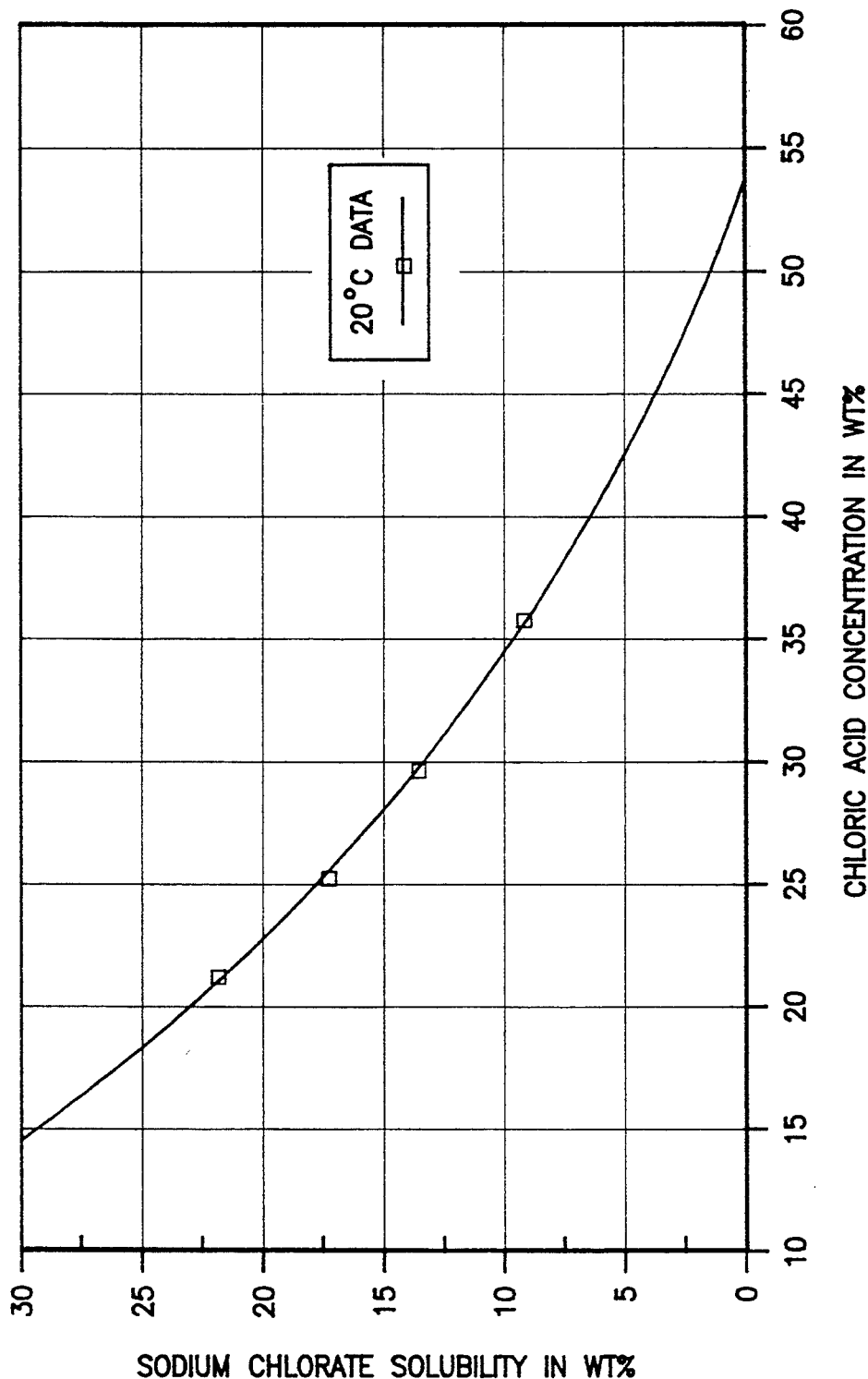
FIG. 4 is a graph illustrating the solubility of sodium chlorate in chloric acid at 20° C.

While any concentration of chloric acid may be employed, the concentration of chloric acid present should be about 1 normal or greater, and preferably is at least 3 normal, for example, from about 3 to about 7 normal $HClO_3$. The aqueous solution of chloric acid, when mixed with the solution of chloric acid and alkali metal chlorate from the ion exchange compartment, contains alkali metal ions in solution. The concentration of alkali metal ions is maintained at less than that required for the formation of solid chlorate salt in the chlorine dioxide generator. As shown in FIG. 4, the solubility of sodium chlorate in the chloric acid solution in the chlorine dioxide generator depends on the concentration of chloric acid. Sodium chlorate crystals will precipitate in the solution in the generator at 20° C. for concentrations above the curve while concentrations below the curve will remain in solution. The sodium chlorate solubility has a natural log function predicted by the equation:

$$Y = -23.07 \ln(x) + 91.84$$

However, for efficient operation of the process, for example, where sodium is present as the alkali metal ion, concentrations up to about 10 wt %, preferably less than about 5 wt %, and more preferably in the range of 0.1 to about 1 wt % of the chloric acid concentration can be employed. The aqueous solution of chloric acid preferably contains about 3.0 normal total acidity or more, is substantially free of anionic and cationic impurities other than alkali metal ions, and has a chloride ion content of less than about 1.0 wt % and preferably less than about 0.1 wt %.

If desired, perchloric acid may be added to the aqueous solution of chloric acid to increase acidity and the chlorine dioxide generation rate. In this embodiment the perchloric acid is used in an amount effective to promote the production of chlorine dioxide where water is the reducing agent. While not wishing to be bound by theory, it is believed that the use of perchloric acid, unlike other acids such as sulfuric acid, is more effective because the hydrogen ions are not "buffered" with the associated acid anions, making the hydrogen ions more available in the chlorine dioxide generation chemical reactions.

In an alternate embodiment, the perchloric acid can also be used in concentrations effective to promote the production of chlorine dioxide in the presence of an added platinum group metal oxide catalyst. In this case, water is the reducing agent and an additional reducing agent is not required. The major by-product accumulating in the generator will be a solution of an alkali metal perchlorate since the effective chlorate concentration in the generator solution is low due to its high reaction rate.

The aqueous solution of chloric acid is fed to a chlorine dioxide generator. A selected reducing agent is present in the chlorine dioxide generator to react with the aqueous solution of chloric acid to produce chlorine dioxide. Suitable reducing agents are those which do not form or contain permanent or persistent anions which would contaminate the spent chloric acid solution recovered from the chlorine dioxide generator. For example, suitable inorganic reducing agents include hydrogen peroxide and alkali metal peroxides i.e, sodium peroxide or potassium peroxide. Organic reducing agents suitable for use include alcohols such as methanol, ethanol, propanol, isopropanol, as well as higher molecular weight linear and branched alcohols. Other suitable organic reducing agents are carbohydrate sugars such as glucose, sucrose, maltose, and others.

An additional group of organic reducing agents are the water soluble carboxylic acids such as formic acid, oxalic acid, lactic acid and their corresponding alkali metal salts such as sodium formate, sodium oxalate, and sodium lactate. A further group of organic type reducing agents which may be employed are glycols such as ethylene and propylene glycol. Still another group of suitable reducing agents are aldehydes such as formaldehyde.

Suitable organic reducing agents, for example, ethylene glycol, carbohydrate sugars, methanol, and other alcohols, will oxidize to form carbon dioxide which exits the generator with the chlorine dioxide and thus do not form persistent anions. During the oxidation of methanol, formic acid is produced as an intermediate prior to being fully oxidized to carbon dioxide. Formic acid may be present as formate ion, but is eventually oxidized and is therefore also not persistent.

In a preferred embodiment, the aqueous solution of chloric acid is contacted with an oxygen-evolving catalyst where the water present is the reducing agent. The perchloric acid concentration in the generator can be in the range of from about 5 to about 50 wt %. The oxygen-evolving catalyst is a solid surface which promotes oxygen evolution. Any solid surface may be used which facilitates oxygen formation. Suitable as oxygen-evolving surfaces or catalysts are, for example, metals and oxides of the elements of Group VIII of the Periodic Table of Elements (Webster's Third New International Dictionary of the English Language, Unabridged, 1986, p. 1680). Thus metals, such as the platinum group metals including platinum, palladium, osmium, iridium, rhodium or ruthenium; and mixtures or alloys of these platinum group metals may be employed. Additionally oxides of platinum group metals, such as palladium, osmium, iridium, rhodium or ruthenium, as well as mixtures of these oxides with platinum group metals or alloys of these precious metals, could be suitably employed. Likewise, iron alloys, such as stainless steel; nickel or nickel based alloys, and cobalt based alloys can be used as oxygen-evolving catalysts in the process of the invention. Other oxygen-evolving catalysts include semiconductive ceramics known as perovskites. The oxygen-evolving catalyst may be used in any form which will suitably promote mass transfer. For example, as particles suspended in the reaction mixture, in a packed bed or supported on an inert substrate.

The chlorine dioxide generator is preferably operated at temperatures in the range of from about 40° to about 90°, and preferably at temperatures of from about 50° to about 80° C. The generator is operated at subatmospheric up to about atmospheric pressures. To avoid spontaneous decomposition, the partial pressure of chlorine dioxide is maintained at less than about 100 mm Hg. This can be done by introducing a diluting gas or by utilizing vacuum to reduce the total pressure of the generator.

The product of the process of the invention is a mixture of gaseous oxygen, chlorine dioxide and water vapor. Concentrations of chlorine dioxide produced include those in the range of from about 0.5 to about 10, and, preferably from about 1 to about 6 percent by volume. The gaseous mixture contains varying concentrations of oxygen and water vapor. A typical ratio of oxygen to $ClO_2$ in the gaseous mixture is from about 1 mol of $O_2$ to about 4 mols of $ClO_2$ by volume. The gaseous product mixture contains amounts of chlorine which are considerably less than those produced in presently operated commercial processes. For example the concentrations of chlorine are less than 10%, and preferably less than 5% by volume of the chlorine dioxide in the mixture.

The novel process of the invention may be operated batch wise or continuously. When operated continuously, it is preferred to continuously add chloric acid and the $HClO_3/NaClO_3$ solution to the generator and remove the gaseous mixture of $ClO_2$, $O_2$ and water vapor as product from the generator in amounts or ratios which maintain a concentrated chloric acid solution in the generator. When operated continuously, the process of the invention converts essentially all of the chlorate ions to chlorine dioxide.

A spent chloric acid solution is removed from the chlorine dioxide generator which contains trace amounts of metallic ions as impurities. Cationic impurities to be removed include aluminum and transition metal ions, such as those of iron, copper, zinc, manganese, nickel, chromium and vanadium. These impurities are present in the reactants in the generator, the catalysts used and the generator apparatus. A portion of this spent chloric acid solution is treated by the process of the invention to eliminate metallic ion impurities such as transition metals which are detrimental to chlorine dioxide generation. The portion of the spent chloric acid solution to be treated is reacted with an alkali metal hydroxide and/or carbonate to precipitate metal impurities while forming an alkaline alkali metal chlorate solution. Suitable alkali metal hydroxides or carbonates include those in which the alkali metals are sodium, potassium and lithium, with sodium being preferred. The amount of spent chloric acid solution which is treated is not critical as long as the desired levels of impurity control are achieved. Similarly the frequency of treatment of the portion of spent chloric acid solution is not critical and may be continuous or periodic.

Precipitates of metal impurities formed may be separated form the alkaline alkali metal chlorate solution using any suitable separation method including settling, filtering, centrifuging or the like.

To reduce the concentration of alkali metals in the alkaline alkali metal chlorate solution, the alkali metal chlorate solution is fed to single or multiple ion exchange compartments of a multi-compartment electrolytic cell. As shown in FIG. 1, an ion exchange compartment is separated from adjacent compartments by a pair of cation exchange membranes. In a preferred embodiment, the ion exchange compartment is adjacent to the anode compartment and the cathode compartment.

The generation of hydrogen ions in the anode compartment is accomplished, for example, by the oxidation of water on the anode into oxygen gas and H+ ions by the electrode reaction as follows:

$$2H_2O \rightarrow O_2 + 4H^+ + 4e^- \tag{1}$$

The anode compartment contains an anolyte, which can be an aqueous solution of any non-oxidizable acid electrolyte which is suitable for conducting hydrogen ions into the ion exchange compartment. Non-oxidizable acids which may be used include sulfuric acid, phosphoric acid, perchloric acid and the like. Where a non-oxidizable acid solution is used as the anolyte, the concentration of the anolyte is preferably selected to match the osmotic concentration characteristics of the alkali metal chlorate solution fed to the ion exchange compartment to minimize water exchange between the anode compartment and the ion exchange compartment. Additionally, an alkali metal chloride solution can be used as the anolyte, which results in a generation of chlorine gas at the anode. Where a chlorine generating anolyte is employed, it is necessary to select a cation exchange membrane as the separator between the anode compartment from the ion exchange compartment which is stable to chlorine gas. The anode compartment may also employ as the anolyte electrolyte a strong acid cation exchange resin in the hydrogen form and an aqueous solution such as deionized water.

Any suitable anode may be employed in the anode compartment, including those which are available commercially as dimensionally stable anodes. Preferably, an anode is selected which will generate oxygen gas. These anodes include porous or high surface area anodes. As materials of construction for the anodes metals including platinum, gold, palladium, or mixtures or alloys thereof, or thin coatings of such materials on various substrates such as valve metals, i.e. titanium, can be used. Additionally oxides of iridium, rhodium or ruthenium, and alloys with other platinum group or precious metals metals could also be employed. Commercially available oxygen evolution anodes of this type include those manufactured by Englehard (PMCA 1500) or Eltech (TIR-2000). Other suitable anode materials include graphite, graphite felt, a multiple layered graphite cloth, a graphite cloth weave, carbon, and the like.

The hydrogen ions generated in the anode compartment pass through the cation exchange membrane into the sodium chlorate solution in the ion exchange compartment. As a hydrogen ion enters the solution, a sodium ion is displaced and by electrical ion mass action passes through the cation membrane adjacent to the cathode compartment to maintain electrical neutrality.

The process as operated results in the conversion of the alkali metal chlorate to chloric acid over a wide range, for example, from about 1 to about 99.9%, preferably from about 5 to about 95, and more preferably from about 10 to about 90%.

The alkali metal chlorate feed solution concentration, the residence time in the ion exchange compartment as well as the cell amperage are factors that affect the extent of the conversion of sodium chlorate to chloric acid. Using very dilute solutions of alkali metal chlorate, high percentages of conversion of $NaClO_3$ to chloric acid can be achieved, i.e. up to 99.9% conversion. For a single pass flow through system, typical residence times in the ion exchange compartment are between about 0.1 to about 120 minutes, with a more preferred range of about 0.5 to about 60 minutes.

The multi-compartment electrolytic cell is operated at a current density of from about 0.01 $KA/m^2$ to about 10 $KA/m^2$, with a more preferred range of about 0.05 $KA/m^2$ to about 3 $KA/m^2$.

Current efficiencies during operation of the process of the invention can be increased by employing additional ion exchange compartments which are adjacent and operated in a series flow pattern as illustrated in FIG. 2.

Adjusting the width of the ion exchange compartment can also alter the operating cell voltage and current efficiency. The width, or space between the cation exchange membranes forming the walls of the ion exchange compartment, is in the range of from about 0.1 to about 10, and preferably from about 0.3 to about 5 centimeters.

In an alternate embodiment the ion exchange compartment contains a cation exchange medium. Cation exchange mediums which can be used in the ion exchange compartment include cation exchange resins. Suitable cation exchange resins include those having substrates and backbones of polystyrene based with divinyl benzene, cellulose based, fluorocarbon based, synthetic polymeric types and the like. Where more than one ion exchange compartment is employed, inclusion of the cation exchange medium is optional for each compartment.

Functional cationic groups on these mediums which may be employed include carboxylic acid, sulfonic or sulfuric acids, and acids of phosphorus such as phosphonous, phosphonic or phosphoric. The cation exchange resins are suitably ionically conductive so that a practical amount of current can be passed between the cation exchange membranes used as separators. Various percentage mixture of resins in the hydrogen form and the alkali metal form may be used in various sections of the ion exchange compartments on assembly to compensate for the swelling and contraction of resins during cell operation. For example, percentage ratios of hydrogen form to alkali metal form may include those from 50 to 100%.

The use of cation exchange resins in the ion exchange compartment can serve as an active mediator which can exchange or absorb alkali metal ions and release hydrogen ions. The hydrogen ions generated at the anode thus regenerate the resin to the hydrogen form, releasing alkali metal ions to pass into the cathode compartment. Their employment is particularly beneficial when feeding dilute alkali metal chlorate solutions as they help reduce the cell voltage and increase conversion efficiency.

Preferred as cation exchange mediums are strong acid type cation exchange resins in the hydrogen form as exemplified by low cross-linked resins such as AMBERLITE ® IRC-118 (Rohm and Haas Co.) as well as higher cross-linked resins i.e. AMBERLITE ® IRC-120. High surface area macroreticular or microporous type ion exchange resins having sufficient ionic conductivity in the ion exchange compartments are also suitable.

Physical forms of the cation exchange resin which can be used are those which can be packed into compartments and include beads, rods, fibers or a cast form with internal flow channels. Bead forms of the resin are preferred.

Cation exchange membranes selected as separators between compartments are those which are inert membranes, and are substantially impervious to the hydrodynamic flow of the alkali metal chlorate solution or the electrolytes and the passage of any gas products produced in the anode or cathode compartments.

Cation exchange membranes are well-known to contain fixed anionic groups that permit intrusion and exchange of cations, and exclude anions from an external source. Generally the resinous membrane or diaphragm has as a matrix, a cross-linked polymer, to which are attached charged radicals such as ——$SO_3^-$ and/or mixtures thereof with ——$COOH^-$. The resins which can be used to produce the membranes include, for example, fluorocarbons, vinyl compounds, polyolefins, hydrocarbons, and copolymers thereof. Preferred are cation exchange membranes such as those comprised of fluorocarbon polymers or vinyl compounds such as divinyl benzene having a plurality of pendant sulfonic acid groups or carboxylic acid groups or mixtures of sulfonic acid groups and carboxylic acid groups. The terms "sulfonic acid group" and "carboxylic acid groups" are meant to include salts of sulfonic acid or salts of carboxylic acid groups by processes such as hydrolysis.

Suitable cation exchange membranes are readily available, being sold commercially, for example, by Ionics, Inc., Sybron, by E.I. DuPont de Nemours & Co., Inc., under the trademark "NAFION ®", by the Asahi Chemical Company under the trademark "ACIPLEX ®", and by Tokuyama Soda Co., under the trademark "NEOSEPTA ®". Among these are the perfluorinated sulfonic acid type membranes which are resistant to oxidation and high temperatures such as DuPont NAFION ® types 117, 417, 423, etc.., membranes from the assignee of U.S. Pat. No. 4,470,888, and other polytetrafluorethylene based membranes with sulfonic acid groupings such as those sold under the RAIPORE tradename by RAI Research Corporation.

The catholyte can be any suitable aqueous solution, including alkali metal chlorides, and any appropriate acids such as hydrochloric, sulfuric, phosphoric, nitric, acetic among others.

In a preferred embodiment, deionized or softened water or an alkali metal hydroxide solution is used as the catholyte in the cathode compartment to produce an alkali metal hydroxide. The water selection is dependent on the desired purity of the alkali metal hydroxide by-product. The cathode compartment may also contain a strong acid cation exchange resin in a cation form such as sodium as the electrolyte.

Any suitable cathode which generates hydrogen gas may be used, including those, for example, based on nickel or its alloys, including nickel-chrome based alloys; steel, including stainless steel types 304, 316, 310, etc.; graphite, graphite felt, a multiple layered graphite cloth, a graphite cloth weave, carbon; and titanium or other valve metals as well as valve metals having coatings which can reduce the hydrogen overvoltage of the cathode. The cathode is preferably perforated to allow for suitable release of the hydrogen gas bubbles produced at the cathode particularly where the cathode is placed against the membrane.

The solution from the ion exchange compartment contains chloric acid and reduced concentrations of alkali metal chlorate. The solution is highly acidic and is substantially free of chloride, sulfate, phosphate, or other anionic groups which are present in commercial processes in which alkali metal chlorate is acidified with mineral or other acids used in the generation of chlorine dioxide. Further, the solutions have low concentrations of alkali metal ions and substantially reduced amounts of metallic impurities.

Where desired, the chloric acid concentrations of these solutions may be increased, for example, by evaporation at sub-atmospheric pressures and temperatures of about 100° C. or less. For example, in the range of from about 30° to about 90° C. Solutions containing up to about 40% by weight of chloric acid may be produced in this manner.

In the process of the invention, the solution of chloric acid and alkali metal chlorate are admixed with the solution of chloric acid fed to the chlorine dioxide generator. The mixture provides increased concentrations of chloric acid, controlled concentrations of alkali metal ions, and substantially reduced concentrations of metallic impurities. In operation, the solution of chloric acid and alkali metal chlorate may be returned directly to the chlorine dioxide generator as shown in FIG. 3. If desired, the solution of chloric acid and alkali metal chlorate may be pumped to a storage or surge tank prior to being fed to the chlorine dioxide generator.

The process results in an increase in production rates of chlorine dioxide by eliminating the formation of solid acidic salts as by-products in the generator. Further, the novel process permits recovery of energy costs by producing, for example, an alkali metal hydroxide solution by-product which can be used in the treatment of the spent chloric acid containing metallic impurities. Further the process reduces operating costs by eliminating process steps and equipment from processes presently available.

Commercial chlorine dioxide processes which may use the purified aqueous solutions of chloric acid and alkali metal chlorate of the invention include the Mathieson and modified Mathieson processes, Solvay, R2, R3, R6, R8, R9, R10, Kesting, SVP, SVP-LITE, SVP-HP, and SVP/methanol, among others.

To further illustrate the invention the following examples are provided without any intention of being limited thereby. All parts and percentages are by weight unless otherwise specified.

EXAMPLE 1

An electrochemical cell of the type shown in FIG. 1 consisting of three compartments machined from ultra high density polyethylene (UHDPE) including an anode compartment, a central ion exchange compartment, and a cathode compartment. The ½ inch (1.27 cm.) thick anode compartment contained a titanium mesh anode having an oxygen-evolving anode coating (PMCA 1500 ® Englehard Corporation, Edison, N.J.). The anode was supported and spaced apart from the UHDPE back wall using multiple layers of polyethylene mesh having ¼ inch square holes and being 1/16 inch in thickness. A polyethylene mesh spacer was positioned between the anode and adjoining membrane to provide an anode-membrane gap of 0.0625 inch (0.1588 centimeters). The anode compartment was filled with a 2.0 percent by weight sulfuric acid solution. The ½ inch (1.27 cm.) thick cathode compartment contained a 304 stainless steel perforated plate cathode mounted flush to the surface of the cathode compartment with the polyethylene mesh spacers. The cathode was positioned in contact with the adjacent membrane providing a zero distance gap. The cathode compartment was initially filled with a sodium hydroxide solution (2% by weight) as the catholyte. Separating the anode compartment from the ion exchange compartment, and the ion exchange compartment from the cathode compartment were a pair of perfluorosulfonic acid cation permeable membranes with a 985 equivalent weight, obtained from the assignee of U.S. Pat. No. 4,470,888. The ion exchange compartment was a machined ¼ inch (0.625 cm) thick frame with inlet and outlet and contained the polyethylene mesh spacers to distribute the chlorate solution as well as to support and separate the two membranes.

An aqueous sodium chlorate solution containing 20 weight percent of $NaClO_3$ was prepared by dissolving reagent grade sodium chlorate in deionized water. During operation of the electrolytic cell, the chlorate solution was metered into the bottom of the ion exchange compartment in a single pass process at feed rates varying from 7.0 g/min. to 14.4 g/min. Electrolyte circulation in the anode and cathode compartments was by gas lift effect only. The cell was operated employing a cell current of 24.5 amperes at a current density of 1.20 $KA/m^2$. The cell voltage varied according to the cell operating temperature. A sample of the product solution was taken at each flow rate, the temperature measured, and the product solution analyzed for chloric acid and sodium chlorate content. The product solutions were colorless, indicating no chlorine dioxide was formed in the ion exchange compartment. The concentration of the sodium hydroxide catholyte during cell operation increased to 12 percent by weight. The results are given in Table I below.

EXAMPLE 2

The electrochemical cell of FIG. 2 was employed having a second ion exchange compartment adjacent to the first ion exchange compartment. The anode compartment containing the same type of anode used in Example 1 was filled with a strong acid hydrogen form cation exchange resin (AMBERLITE ® IRC-120 plus, Rohm & Haas Company) as the electrolyte. A perfluorinated sulfonic acid-based membrane (Dupont NAFION ® 417) separated the anode compartment from the first ion exchange compartment. The two ion exchange compartments were fully filled with AMBERLITE ® IRC-120 plus cation exchange resin in the hydrogen form and were separated by a Dupont NAFION ® 417 membrane. The same membrane was employed to separate the second ion exchange compartment from the cathode compartment. The cathode compartment contained a perforated 304 stainless steel cathode, and was filled with a sodium form AMBERLITE ® IRC-120 plus cation exchange resin. Both the anode compartment and the cathode compartment were filled with deionized water. The sodium chlorate solution fed to the ion exchange compartments was prepared from reagent grade sodium chlorate dissolved in deionized water to form a 16 weight percent solution as sodium chlorate. The sodium chlorate solution at 20° C. was fed to the bottom of ion exchange compartment 40 adjacent to the cathode compartment at a flow rate of 6.5 grams per minute. The chloric acid—sodium chlorate solution flow from the upper part of ion exchange compartment 40 was routed into the bottom of ion exchange compartment 20 adjacent to the anode compartment and collected from the top of ion exchange compartment 20. The total residence time of the solution in the ion exchange compartments was about 42 minutes.

During operation of the cell, the cell current was set at a constant 23.0 amperes for an operating current density of 1.5 KA/$m^2$. The cell voltage stabilized at 9.60 volts, and the product temperature was 65° C. Circulation in the anode and cathode compartments of the electrolyte was by gas lift effect and the liquid level of the gas disengagers was set at 3 inches (7.62cm) above the height of the cell.

The product solution from the cell contained 11.44 weight percent as $HClO_3$ which represented a 90% conversion of the sodium chlorate to chloric acid. The current efficiency was determined to be 61.6% and the power consumption was 4490 KWH/Ton of $HClO_3$. The product solution was light yellow in color, indicating the presence of some chlorine dioxide or chlorine in the chloric acid-sodium chlorate solution product.

EXAMPLE 3

A low sodium content chloric acid solution feedstock containing about 35 wt. % $HClO_3$, 0.50 wt. % $NaClO_3$, as well as 0.010 wt. % each of impurities equivalent as the chlorate salts of $Fe(ClO_3)_3$. $Mg(ClO_3)_2$ is fed from an isolating surge tank on level control and pumped into a chlorine dioxide generator at a rate of about 270.4 gms per minute. The generator vessel is a 400 liter glass lined reactor having a conical bottom and drain that is initially filled with about 180 liters of the chloric acid solution feed. The solution is heated by pumping it through a heat exchanger with titanium tubes and having a total heat exchange area of about 2 square meters. Steam is added to the heat exchanger through a control valve until a temperature of about 75° C. is obtained. The generator is connected at the top to a condenser, maintained at a temperature of about 40° C., and the vent is connected to the gas inlet at the bottom of a packed column 3 meters high and 0.2 meters in diameter, packed with 1 cm ceramic saddles. The column is connected at the top to a steam jet ejector. The ejector is operated to evacuate the system to obtain a total absolute pressure of about 200 mm Hg. at which condition, water is evaporated from the generator.

A 70 wt. % hydrogen peroxide solution is metered into the generator at a rate of about 15.2 gms. per minute to generate chlorine dioxide at a rate of about 75.6 gms. per minute (10 lbs/hr), oxygen at a rate of about 17.9 grams per minute, and water vapor at about 107.1 gms. per minute. Chilled water is added to the condenser and the chiller at a rate of about 77.6 liters per minute. The combined stream of condensate and absorber bottoms product is analyzed by adding neutral KI to a sample followed by titration with sodium thiosulfate as the titrant to a starch end point. After adding excess HCl to the sample, additional titration with thiosulfate is performed. The titrations determined that the product contains approximately 10 grams per liter of chlorine dioxide and less than about 0.2 gm. per liter chlorine (the limit of detection).

In the generator, sodium and other impurities introduced from the chloric acid feed solution mixture accumulate until a generator solution composition of about 15 wt. % $HClO_3$, about 20 wt. % $NaClO_3$, as well as 0.25 wt. % each of impurities equivalent as the chlorate salts of $Fe(ClO_3)_3$, $Mg(ClO_3)_2$, and $Ca(ClO_3)_2$ is present. The acidity of the chloric acid—sodium chlorate solution, usually about 2.5 normal, is determined by measuring the specific gravity of the generator solution at this operating condition. A solution slipstream of about 31.3 gms. per minute is then continuously removed from the operating generator to maintain the solution composition at the above steady state composition. The slipstream solution is introduced into a mixed neutralization tank and made alkaline to a pH of between about 11-12 using about 13.0 gms. of a 20 wt. % NaOH solution and about 2.0 gms. of sodium carbonate. The sodium chlorate solution containing precipitated ferric and magnesium hydroxides and calcium carbonate is then filtered through a 0.1 micron filter element. The filtrate flows into a feed storage tank for the sodium chlorate salt-splitting electrochemical cell. The filtered alkaline solution stream from the neutralization tank has a solution composition of about 27.6 wt. % as $NaClO_3$.

The electrochemical cell is a 0.069 $m^2$ membrane surface area cell as shown in FIG. 1 having an anode compartment, an ion exchange compartment, and cathode compartment. The electrochemical cell anode compartment uses an Eltech EC-1500 oxygen evolving anode coating on an expanded titanium metal substrate. The cathode structure is a perforated 316 stainless steel plate. The ion exchange compartment, machined from polyvinylidene difluoride (PVDF), has a DuPont NAFION 417 cation exchange membrane adjacent the anode compartment and a NAFION 324 cation exchange membrane adjacent the cathode compartment. The alkaline sodium chlorate solution filtrate is fed into the bottom of the ion exchange compartment at a rate of about 46.3 gms. per minute. At an applied current of 278 amperes and cell voltage of about 5.5 volts, current efficiency based on the production of sodium hydroxide as the catholyte is about 40%, and sodium chlorate conversion to chloric acid is about 60%. The product from the ion exchange compartment is a solution containing about 13.2% wt. % $HClO_3$ and 11.1 wt. % $NaClO_3$. The solution is removed at a mass flow rate of about 42.7 gms. per minute and is fed into a product surge tank. From the surge tank the $HClO_3/NaClO_3$ is pumped and metered back into the chlorine dioxide generator to maintain a steady-state operation of the generator and the solution composition. The byproduct NaOH catholyte, at a concentration of about 20 wt. % NaOH, is removed from the electrolytic cell catholyte compartment at a mass flow rate of about 13.8 gms. per minute and is collected for use in neutralizing the acidic generator slipstream in the neutralization tank.

TABLE I

| | | NaClO3 Feed | | NClO3–NaClO3 Product | | | | | | |
|---|---|---|---|---|---|---|---|---|---|---|
| Cell Volts | Cell Amps | Flowrate (gm/min) | Product Temp (C.) | HClO3 Wt % | NaClO3 Wt % | HClO3:NaClO3 Molar Ratio | Conversion % to HClO3 | C.E. % | Residence Time (min) | KWH/TON of HClO3 |
| 5.00 | 24.5 | 14.40 | 30.0 | 5.96 | 12.49 | 0.60 | 38.00 | 69.50 | 11.38 | 2082 |
| 4.87 | 24.5 | 12.35 | 42.0 | 6.51 | 11.80 | 0.70 | 41.00 | 65.20 | 13.27 | 2152 |
| 4.76 | 24.5 | 10.00 | 45.0 | 7.24 | 10.88 | 0.84 | 45.60 | 58.60 | 16.39 | 2336 |
| 4.50 | 24.5 | 7.17 | 50.0 | 8.34 | 9.49 | 1.11 | 52.60 | 48.50 | 22.86 | 2674 |
| 4.44 | 24.5 | 7.00 | 54.0 | 8.43 | 9.38 | 1.13 | 53.10 | 47.80 | 23.41 | 2673 |

What is claimed is:

1. A process for producing chlorine dioxide which comprises:
   a) feeding an aqueous solution of chloric acid to a chlorine dioxide generator,
   b) reacting said aqueous solution of chloric acid with a reducing agent in the chlorine dioxide generator to produce chlorine dioxide and a spent chloric acid solution containing metallic impurities,
   c) reacting a portion of said spent chloric acid solution containing metallic impurities with a basic compound selected from the group consisting of alkali metal hydroxides and alkali metal carbonates in a neutralizing zone to form a precipitate of the metallic impurities and an alkali metal chlorate solution,
   d) separating said precipitate of the metallic impurities from the alkali metal chlorate solution,
   e) feeding said alkali metal chlorate solution to an ion exchange compartment of an electrolytic cell having an anode compartment, a cathode compartment, and at least one ion exchange compartment between the anode compartment and the cathode compartment,
   f) electrolyzing an anolyte in the anode compartment to generate hydrogen ions,
   g) passing the hydrogen ions from the anode compartment through a cation exchange membrane into the ion exchange compartment to displace alkali metal ions and produce an aqueous solution of chloric acid and alkali metal chlorate,
   h) passing alkali metal ions from the ion exchange compartment through a cation exchange membrane into the cathode compartment,
   i) returning the aqueous solution of chloric acid and alkali metal chlorate to said chlorine dioxide generator, and
   j) reacting said aqueous solution of chloric acid and alkali metal chlorate with additional aqueous solution of chloric acid and a reducing agent to produce chloride dioxide and a spent chloric acid and alkali metal chlorate solution containing metallic impurities.

2. The process of claim 1 in which the alkali metal chlorate is selected from the group consisting of sodium chlorate, potassium chlorate and lithium chlorate.

3. The process of claim 1 in which the conversion of alkali metal chlorate to chloric acid is in the range of from about 1 to about 99.9 percent.

4. The process of claim 1 in which the basic compound is an alkali metal hydroxide.

5. The process of claim 1 wherein the aqueous solutions of chloric acid in steps (a) and (j) have concentrations of chloric acid from about 1 to about 7 normal $HClO_3$.

6. The process of claim 5 wherein the concentration of alkali metal ions in the aqueous solutions of chloric acid in steps (a) and (j) is up to about 10 wt. percent.

7. The process of claim 1 in which the chlorine dioxide generator contains an oxygen-evolving catalyst in solid form selected from metals and oxides of cobalt, iridium, iron, nickel, palladium, platinum, osmium, rhodium and ruthenium, and mixtures and alloys containing these elements.

8. The process of claim 7 wherein the solution of chloric acid in steps (a) and (j) contain perchloric acid and water is the reducing agent in steps (b) and (j).

9. The process of claim 8 in which said perchloric acid concentrations in steps (a) and (j) are from about 5 to about 50 wt. percent.

10. The process of claim 9 in which the oxygen-evolving catalyst is selected from the group consisting of metals and oxides of iridium, palladium, osmium, rhodium and ruthenium, and mixtures thereof.

11. The process of claim 1 wherein the catholyte solution in said cathode compartment is an alkali metal hydroxide solution.

12. The process of claim 1 wherein said reducing agent is selected from the group consisting of water, hydrogen peroxide, sodium peroxide, potassium peroxide, alcohols, carbohydrate sugars, water-soluble carboxylic acid, glycols, and aldehydes.

13. A process for producing chlorine dioxide which comprises:
   a) feeding an aqueous solution of chloric acid to a chlorine dioxide generator,
   b) reacting said aqueous solution of chloric acid with a reducing agent in the chlorine dioxide generator to produce chlorine dioxide and a spent chloric acid solution containing metallic impurities,
   c) reacting a portion of said spent chloric acid solution containing metallic impurities with a basic compound selected from the group consisting of alkali metal hydroxides and alkali metal carbonates in a neutralizing zone to form a precipitate of the metallic impurities and an alkali metal chlorate solution,
   d) separating the precipitate of the metallic impurities from the alkali metal chlorate solution,
   e) feeding the alkali metal chlorate solution to an ion exchange compartment of an electrolytic cell having an anode compartment, a cathode compartment, and at least one ion exchange compartment between the anode compartment and the cathode compartment,
   f) electrolyzing an anolyte in the anode compartment to generate hydrogen ions,
   g) passing and hydrogen ions from the anode compartment through a cation exchange membrane into the ion exchange compartment to displace alkali metal ions and produce an aqueous solution of chloric acid and alkali metal chlorate, h) passing alkali metal ions from the ion exchange compartment through a cation exchange membrane into the cathode compartment, i) feeding the aqueous solution of chloric acid and alkali metal chlorate to the anode compartment of the electrolytic cell, j) electrolyzing the aqueous solution of chloric acid and alkali metal chlorate in the anode compartment to produce an aqueous solution of chloric acid, alkali metal chlorate, and perchloric acid, k) returning said aqueous solution of chloric acid, alkali metal chlorate, and perchloric acid to said chlorine dioxide generator, and l) reacting said aqueous solution of chloric acid, alkali metal chlorate, and percholoric acid with additional aqueous solution of chloric acid and a reducing agent to produce chlorine dioxide and a spent chloric acid, alkali metal chlorate, and perchloric acid solution containing metallic impurities.

* * * * *